United States Patent
Liu et al.

(10) Patent No.: US 8,954,908 B1
(45) Date of Patent: Feb. 10, 2015

(54) FAST MONTE CARLO STATISTICAL ANALYSIS USING THRESHOLD VOLTAGE MODELING

(71) Applicant: Cadence Design Systems, Inc., San Jose, CA (US)

(72) Inventors: Hongzhou Liu, Sewickley, PA (US); Jushan Xie, Pleasanton, CA (US); Michael Tian, San Jose, CA (US); An-Chang Deng, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/939,117

(22) Filed: Jul. 10, 2013

(51) Int. Cl.
*G06F 17/50* (2006.01)

(52) U.S. Cl.
CPC ............................ *G06F 17/5036* (2013.01)
USPC ........... 716/106; 716/101; 716/107; 716/110; 716/136; 703/14

(58) Field of Classification Search
USPC ................ 716/100–107, 136; 703/13–15, 20
See application file for complete search history.

(56) References Cited

U.S. PATENT DOCUMENTS

| | | | |
|---|---|---|---|
| 8,204,730 B2* | 6/2012 | Liu et al. | 703/13 |
| 2003/0066034 A1* | 4/2003 | Gross et al. | 716/1 |
| 2005/0177356 A1* | 8/2005 | Yonezawa | 703/14 |
| 2006/0059446 A1* | 3/2006 | Chen et al. | 716/6 |
| 2007/0156367 A1* | 7/2007 | Kucukcakar et al. | 702/123 |
| 2009/0306953 A1* | 12/2009 | Liu et al. | 703/14 |
| 2010/0109676 A1* | 5/2010 | Zjajo et al. | 324/537 |
| 2010/0153086 A1* | 6/2010 | Satoh | 703/14 |
| 2012/0046923 A1* | 2/2012 | Liu | 703/2 |

OTHER PUBLICATIONS

Asen Asenov, "Random Dopant Induced Threshold Voltage Lowering and Fluctuations in Sub-0.1 μm MOSFET's: A 3-D "Stomistic" Simulation Study", IEEE Transactions on Electron Devices, vol. 45, No. 12, Dec. 1998; pp. 2505-2513.

* cited by examiner

*Primary Examiner* — Paul Dinh
(74) *Attorney, Agent, or Firm* — Kenyon & Kenyon LLP (57) ABSTRACT

A system, method, and computer program product for automatically approximating conventional Monte Carlo statistical device model evaluation for circuit simulation with drastic speed improvements, while preserving significant accuracy. Embodiments enable quick inspection of the effects of process mismatch variations on single devices and even large circuits compared to standard computationally prohibitive Monte Carlo analysis. Statistical device model variation is calculated as if all such variation is due to changes in threshold voltage, even though other physical phenomena are known to contribute. Threshold voltage variation is modeled as a function of statistical variation, device size, and working bias condition. Circuit simulation is faster when the full internal device model parameter set is not rebuilt for every Monte Carlo analysis iteration. Embodiments are compatible with both conventional SPICE and newer Fast SPICE simulations. Circuit designers may capture design sensitivity to manufacture process changes more easily with simplified statistical models.

21 Claims, 12 Drawing Sheets

FIG. 1

| STANDARD DEVIATION FROM SPICE SIMULATION (MEAN = 1.0) | STANDARD DEVIATION FROM FAST SPICE WITH 5% ERROR | STANDARD DEVIATION DIFFERENCE IN PERCENTAGE |
|---|---|---|
| 0.05 | 0.0578 | 15.60% |
| 0.10 | 0.1041 | 4.10% |
| 0.15 | 0.1528 | 1.87% |
| 0.20 | 0.2022 | 1.10% |
| 0.25 | 0.2518 | 0.72% |
| 0.30 | 0.3015 | 0.50% |
| 0.35 | 0.3513 | 0.37% |
| 0.40 | 0.4012 | 0.30% |
| 0.45 | 0.4511 | 0.24% |
| 0.50 | 0.501 | 0.2% |
| 0.55 | 0.551 | 0.18% |
| 0.60 | 0.6009 | 0.15% |
| 0.65 | 0.6509 | 0.14% |
| 0.70 | 0.7009 | 0.13% |
| 0.75 | 0.7509 | 0.12% |
| 0.80 | 0.8009 | 0.11% |
| 0.85 | 0.8508 | 0.09% |
| 0.90 | 0.9008 | 0.09% |
| 0.95 | 0.9508 | 0.08% |
| 1.00 | 1.008 | 0.08% |

FIG. 2

| L=30nm, Vds=0.9V | W/L=5 | W/L=10 | W/L=15 | W/L=20 | W/L=25 | W/L=30 |
|---|---|---|---|---|---|---|
| Vgs=0.1V | 59.38% | 39.24% | 30.84% | 26.04% | 22.96% | 20.78% |
| Vgs=0.2V | 59.29% | 40.80% | 32.99% | 28.64% | 25.76% | 23.67% |
| Vgs=0.3V | 52.92% | 38.19% | 31.33% | 27.54% | 24.94% | 23.02% |
| Vgs=0.4V | 38.16% | 30.39% | 25.83% | 23.44% | 21.61% | 20.17% |
| Vgs=0.5V | 23.02% | 19.40% | 16.99% | 15.90% | 14.97% | 14.18% |
| Vgs=0.6V | 14.37% | 12.08% | 10.63% | 9.90% | 9.31% | 8.82% |
| Vgs=0.7V | 9.57% | 8.05% | 7.14% | 6.62% | 6.20% | 5.86% |
| Vgs=0.8V | 6.73% | 5.62% | 5.03% | 4.65% | 4.35% | 4.10% |
| Vgs=0.9V | 5.13% | 4.20% | 3.77% | 3.47% | 3.23% | 3.03% |

FIG. 3

| L=30nm, Vgs=0.9V | W/L=5 | W/L=10 | W/L=15 | W/L=20 | W/L=25 | W/L=30 |
|---|---|---|---|---|---|---|
| Vds=0.1V | 2.97% | 2.40% | 2.18% | 2.07% | 1.98% | 1.90% |
| Vds=0.2V | 3.81% | 3.28% | 2.99% | 2.86% | 2.73% | 2.61% |
| Vds=0.3V | 4.73% | 3.99% | 3.61% | 3.38% | 3.19% | 3.02% |
| Vds=0.4V | 4.99% | 4.17% | 3.76% | 3.50% | 3.28% | 3.10% |
| Vds=0.5V | 5.08% | 4.22% | 3.79% | 3.52% | 3.30% | 3.11% |
| Vds=0.6V | 5.12% | 4.23% | 3.80% | 3.51% | 3.29% | 3.09% |
| Vds=0.7V | 5.13% | 4.22% | 3.80% | 3.50% | 3.27% | 3.07% |
| Vds=0.8V | 5.13% | 4.21% | 3.79% | 3.48% | 3.25% | 3.05% |
| Vds=0.9V | 5.13% | 4.20% | 3.77% | 3.47% | 3.23% | 3.03% |

| L=30nm, Vgs=0.9V | W/L=5 | W/L=10 | W/L=15 | W/L=20 | W/L=25 | W/L=30 |
|---|---|---|---|---|---|---|
| Vds=0.1V | 9.43E-07 | 1.42E-06 | 1.86E-06 | 2.32E-06 | 2.74E-06 | 3.12E-06 |
| Vds=0.2V | 2.00E-06 | 3.15E-06 | 4.12E-06 | 5.14E-06 | 6.04E-06 | 6.84E-06 |
| Vds=0.3V | 2.94E-06 | 4.51E-06 | 5.83E-06 | 7.10E-06 | 8.22E-06 | 9.22E-06 |
| Vds=0.4V | 3.35E-06 | 5.09E-06 | 6.56E-06 | 7.92E-06 | 9.13E-06 | 1.02E-05 |
| Vds=0.5V | 3.59E-06 | 5.42E-06 | 6.99E-06 | 8.41E-06 | 9.67E-06 | 1.08E-05 |
| Vds=0.6V | 3.77E-06 | 5.66E-06 | 7.30E-06 | 8.76E-06 | 1.01E-05 | 1.12E-05 |
| Vds=0.7V | 3.90E-06 | 5.86E-06 | 7.55E-06 | 9.05E-06 | 1.04E-05 | 1.16E-05 |
| Vds=0.8V | 4.02E-06 | 6.03E-06 | 7.77E-06 | 9.30E-06 | 1.07E-05 | 1.19E-05 |
| Vds=0.9V | 4.13E-06 | 6.18E-06 | 7.98E-06 | 9.53E-06 | 1.09E-05 | 1.22E-05 |

| L=30nm, Vds=0.9V | W/L=5 | W/L=10 | W/L=15 | W/L=20 | W/L=25 | W/L=30 |
|---|---|---|---|---|---|---|
| Vgs=0.1V | 2.45E-10 | 2.00E-10 | 1.95E-10 | 1.83E-10 | 1.81E-10 | 1.83E-10 |
| Vgs=0.2V | 3.75E-09 | 3.03E-09 | 2.94E-09 | 2.73E-09 | 2.68E-09 | 2.70E-09 |
| Vgs=0.3V | 4.83E-08 | 4.08E-08 | 4.00E-08 | 3.73E-08 | 3.68E-08 | 3.71E-08 |
| Vgs=0.4V | 3.70E-07 | 3.68E-07 | 3.82E-07 | 3.78E-07 | 3.84E-07 | 3.95E-07 |
| Vgs=0.5V | 1.24E-06 | 1.50E-06 | 1.69E-06 | 1.85E-06 | 1.99E-06 | 2.13E-06 |
| Vgs=0.6V | 2.33E-06 | 3.12E-06 | 3.1E-06 | 4.25E-06 | 4.75E-06 | 5.21E-06 |
| Vgs=0.7V | 3.24E-06 | 4.63E-06 | 5.71E-06 | 6.70E-06 | 7.59E-06 | 8.40E-06 |
| Vgs=0.8V | 3.78E-06 | 5.60E-06 | 7.10E-06 | 8.46E-06 | 9.67E-06 | 1.08E-05 |
| Vgs=0.9V | 4.13E-06 | 6.18E-06 | 7.98E-06 | 9.53E-06 | 1.09E-05 | 1.22E-05 |

FIG. 7A

| L=30nm, Vgs=0.9V | W/L=5 | W/L=10 | W/L=15 | W/L=20 | W/L=25 | W/L=30 |
|---|---|---|---|---|---|---|
| Vds=0.1V | 1.21E-06 | 1.76E-06 | 2.16E-06 | 2.52E-06 | 2.84E-06 | 3.12E-06 |
| Vds=0.2V | 2.53E-06 | 3.62E-06 | 4.42E-06 | 5.15E-06 | 5.79E-06 | 6.35E-06 |
| Vds=0.3V | 3.39E-06 | 4.74E-06 | 5.74E-06 | 6.63E-06 | 7.40E-06 | 8.10E-06 |
| Vds=0.4V | 3.70E-06 | 5.15E-06 | 6.21E-06 | 7.18E-06 | 8.01E-06 | 8.75E-06 |
| Vds=0.5V | 3.86E-06 | 5.36E-06 | 6.47E-06 | 7.47E-06 | 8.34E-06 | 9.11E-06 |
| Vds=0.6V | 3.96E-06 | 5.50E-06 | 6.64E-06 | 7.66E-06 | 8.55E-06 | 9.34E-06 |
| Vds=0.7V | 4.03E-06 | 5.60E-06 | 6.76E-06 | 7.80E-06 | 8.71E-06 | 9.52E-06 |
| Vds=0.8V | 4.09E-06 | 5.68E-06 | 6.86E-06 | 7.91E-06 | 8.83E-06 | 9.66E-06 |
| Vds=0.9V | 4.13E-06 | 5.74E-06 | 6.93E-06 | 8.01E-06 | 8.93E-06 | 9.77E-06 |

| L=30nm, Vds=0.9V | W/L=5 | W/L=10 | W/L=15 | W/L=20 | W/L=25 | W/L=30 |
|---|---|---|---|---|---|---|
| Vgs=0.1V | 2.12E-10 | 1.77E-10 | 1.74E-10 | 1.62E-10 | 1.58E-10 | 1.59E-10 |
| Vgs=0.2V | 3.29E-09 | 2.70E-09 | 2.63E-09 | 2.42E-09 | 2.36E-09 | 2.35E-09 |
| Vgs=0.3V | 4.41E-08 | 3.68E-08 | 3.61E-08 | 3.35E-08 | 3.24E-08 | 3.24E-08 |
| Vgs=0.4V | 3.64E-07 | 3.42E-07 | 3.50E-07 | 3.39E-07 | 3.39E-07 | 3.44E-07 |
| Vgs=0.5V | 1.27E-06 | 1.42E-06 | 1.56E-06 | 1.65E-06 | 1.75E-06 | 1.84E-06 |
| Vgs=0.6V | 2.44E-06 | 3.01E-06 | 3.45E-06 | 3.82E-06 | 4.15E-06 | 4.47E06 |
| Vgs=0.7V | 3.41E-06 | 4.48E-06 | 5.28E-06 | 5.96E-06 | 6.58E-06 | 7.12E-06 |
| Vgs=0.8V | 3.93E-06 | 5.36E-06 | 6.42E-06 | 7.38E-06 | 8.20E-06 | 8.94E-06 |
| Vgs=0.9V | 4.13E-06 | 5.74E-06 | 6.93E-06 | 8.01E-06 | 8.93E-06 | 9.77E-06 |

FIG. 7B

| L=30nm, Vgs=0.9V | W/L=5 | W/L=10 | W/L=15 | W/L=20 | W/L=25 | W/L=30 |
|---|---|---|---|---|---|---|
| Vds=0.1V | 27.77% | 24.00% | 16.35% | 8.79% | 3.40% | -0.16% |
| Vds=0.2V | 26.71% | 15.01% | 7.18% | 0.23% | -4.10% | -7.13% |
| Vds=0.3V | 15.42% | 5.25% | -1.58% | -6.54% | -9.90% | -12.19% |
| Vds=0.4V | 10.40% | 1.30% | -5.25% | -9.39% | -12.27% | -14.31% |
| Vds=0.5V | 7.38% | -1.10% | -7.38% | -11.20% | -13.81% | -15.66% |
| Vds=0.6V | 5.15% | -2.86% | -8.98% | -12.63% | -15.05% | -16.83% |
| Vds=0.7V | 3.26% | -4.51% | -10.53% | -13.86% | -16.18% | -17.81% |
| Vds=0.8V | 1.58% | -5.85% | -11.72% | -14.94% | -17.18% | -18.71% |
| Vds=0.9V | 0.00% | -7.25% | -13.10% | -16.02% | -18.21% | -19.65% |

| L=30nm, Vds=0.9V | W/L=5 | W/L=10 | W/L=15 | W/L=20 | W/L=25 | W/L=30 |
|---|---|---|---|---|---|---|
| Vgs=0.1V | -13.46% | -11.36% | -10.80% | -11.56% | -12.41% | -13.26% |
| Vgs=0.2V | -12.48% | -10.88% | -10.41% | -11.20% | -12.07% | -12.90% |
| Vgs=0.3V | -8.81% | -9.66% | -9.81% | -10.86% | -11.87% | -12.78% |
| Vgs=0.4V | -1.61% | -6.91% | -8.52% | -10.38% | -11.78% | -12.95% |
| Vgs=0.5V | 2.61% | -4.85% | -7.65% | -10.31% | -12.24% | -13.77% |
| Vgs=0.6V | 4.73% | -3.51% | -7.10% | -10.26% | -12.54% | -14.30% |
| Vgs=0.7V | 5.36% | -3.24% | -7.61% | -11.05% | -13.36% | -15.19% |
| Vgs=0.8V | 4.14% | -4.31% | -9.58% | -12.83% | -15.23% | -16.88% |
| Vgs=0.9V | 0.00% | -7.25% | -13.10% | -16.02% | -18.21% | -19.65% |

Absolute Mean = 10.45%     Maximum = 27.77%

FIG. 7C

| 72 Stage Inverter Chain | Fast SPICE | Embodiment Described | Mean Value Error | Fast SPICE | Embodiment Described | Standard Deviation Error |
| --- | --- | --- | --- | --- | --- | --- |
| Delay 1 | 3.24E-10 | 3.13E-10 | -3.61% | 1.66E-12 | 1.61E-12 | -2.61% |
| Delay 2 | 6.26E-10 | 6.03E-10 | -3.74% | 2.15E-12 | 2.24E-12 | 4.14% |
| Delay 3 | 9.28E-10 | 8.93E-10 | -3.78% | 2.64E-12 | 2.71E-12 | 2.71% |
| Delay 4 | 1.23E-09 | 1.18E-09 | -3.81% | 2.99E-12 | 3.04E-12 | 1.94% |
| Delay 5 | 1.53E-09 | 1.47E-09 | -3.82% | 3.21E-12 | 3.45E-12 | 7.44% |
| Delay 6 | 1.83E-09 | 1.76E-09 | -3.83% | 3.40E-12 | 3.83E-12 | 12.53% |
| Delay 7 | 2.14E-09 | 2.05E-09 | -3.84% | 3.74E-12 | 4.01E-12 | 7.19% |
| Delay 8 | 2.44E-09 | 2.34E-09 | -3.85% | 3.96E-12 | 4.26E-12 | 7.72% |
| Delay 9 | 2.74E-09 | 2.63E-09 | -3.85% | 4.26E-12 | 4.49E-12 | 5.36% |
| Delay 10 | 3.04E-09 | 2.92E-09 | -3.85% | 4.51E-12 | 4.74E-12 | 5.12% |
| Delay 11 | 3.34E-09 | 3.21E-09 | -3.86% | 4.70E-12 | 5.00E-12 | 6.43% |
| Delay 12 | 3.64E-09 | 3.50E-09 | -3.87% | 4.94E-12 | 5.21E-12 | 5.38% |

| Simulation Tool | Elapsed Time (sec) |
| --- | --- |
| Fast SPICE | 21600 |
| Embodiment Described | 510 |
| Speedup Factor | 42.35 |

FAST MONTE CARLO STATISTICAL ANALYSIS USING THRESHOLD VOLTAGE MODELING

BACKGROUND

Statistical variation plays an important role in circuit design efforts, particularly in advanced semiconductor fabrication processes, such as those with feature sizes below forty-five nanometers. Device mismatch variation is of particular concern. Circuit designers should therefore consider statistical variation when running circuit simulations.

Designers rely on Monte Carlo analysis to approve designs with the reduced feature sizes that are common nowadays. Monte Carlo analysis involves simulating a circuit with a wide range of randomly chosen device samples. The result is a distribution of predicted circuit behaviors that may be used to guide circuit design evolution. Thousands of such simulations are often needed.

It is currently computationally expensive to run a Monte Carlo analysis because each Monte Carlo iteration is a completed circuit simulation run, including device model parsing and calculation, and then real circuit analysis. It may generally be infeasible to run Monte Carlo simulations via conventional SPICE circuit analyses on large circuits, because each iteration may take hours.

Recent developments in so-called Fast SPICE technologies may achieve up to 100× speed increases compared to conventional SPICE circuit simulation. The state of the art Fast SPICE technology, however, has an inherent two to five percent inaccuracy compared to full SPICE circuit simulation. Circuit designers will want to know how the up to five percent Fast SPICE error impacts the final output result distributions in statistical simulations. More broadly, designers want to determine how Fast SPICE technology may be best leveraged for fast and relatively accurate statistical analysis capability.

Accordingly, the inventors have developed a novel method to quickly and accurately capture device model statistical variation for use with conventional SPICE simulators and the improved Fast SPICE simulation tools.

DETAILED DESCRIPTION

This application presents a system, method, and computer program product for automatically approximating conventional Monte Carlo statistical device model evaluation for circuit simulation with drastic speed improvements, while preserving significant accuracy. Embodiments may enable quick inspection of the effects of process mismatch variations on single devices and even large circuits compared to computationally prohibitive standard Monte Carlo analysis. Statistical device model variation may be calculated as if all such variation is due to changes in threshold voltage or other dominant parameter or dominant parameter combination, even though other physical phenomena are known to contribute. Circuit simulation may be faster when the full internal device model parameter set is not rebuilt for every analysis iteration. Embodiments are compatible with both conventional SPICE and newer Fast SPICE simulations.

Figure 1:
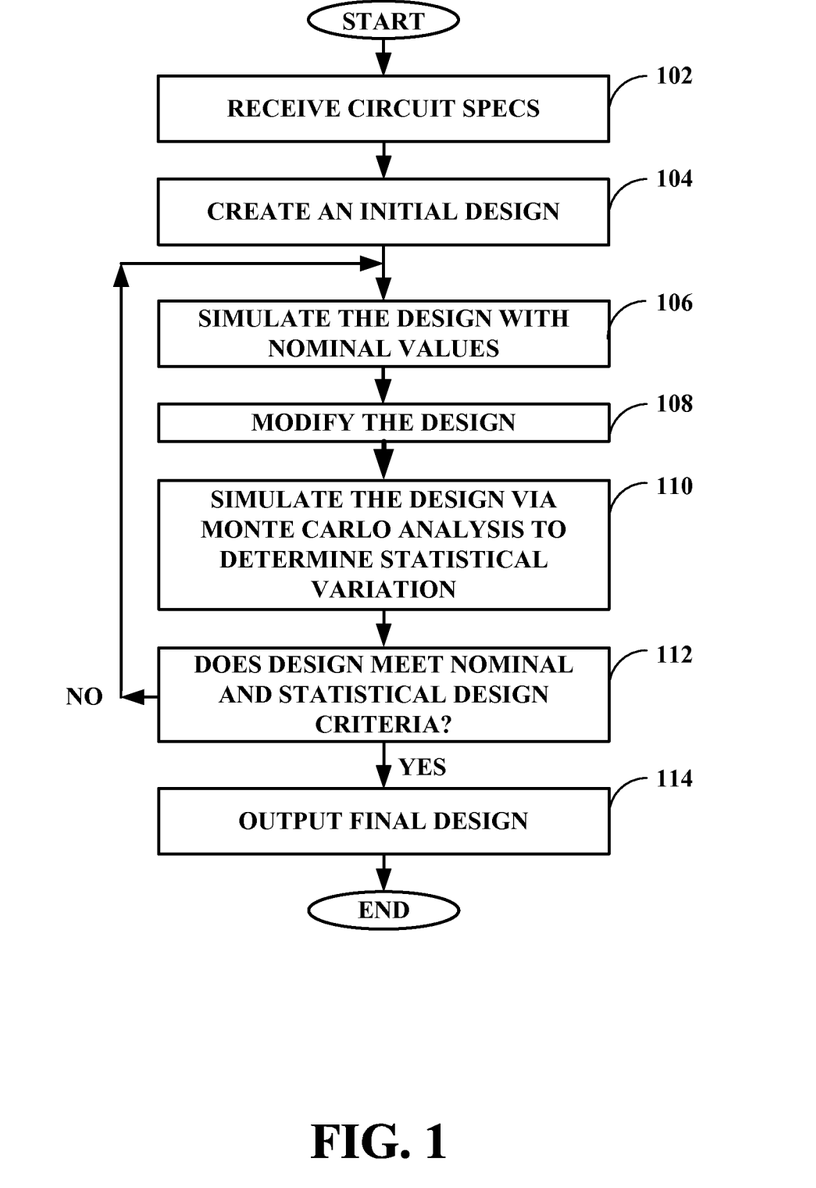
FIG. 1 is a flowchart of a typical circuit design process, according to an embodiment.

FIG. 1 shows a flowchart of a typical circuit design process according to an embodiment. A circuit designer may receive new circuit specifications, in 102. At 104, the designer may create an initial circuit design. The design may or may not meet the specifications with nominal device values, and also may or may not meet the specifications considering the statistical device mismatch variation. Thus, in 106 the designer may simulate the design with nominal device values. In 108, the designer may modify the design to correct circuit performance; although not shown here separately, design modification with even nominal values is typically iterative.

At 110, the designer may simulate the design via Monte Carlo analysis to determine the circuit's performance, including statistical variation. This step is often computationally intensive, and so may currently generally not included in the iterative design process for nominal values, but may be done separately if at all. Each device instance in a design may have model parameters that may vary, so each device instance may require generation of a varied set of model parameters. When this is repeated for every device for perhaps thousands of Monte Carlo simulation runs, it is easy to see how this task may be quite time-consuming.

At 112, the designer may determine if the circuit's performance meets both nominal and statistical design criteria previously specified. If so, the final design may be output in 114, but if not, the designer may now modify the design again. When each modification involves perhaps hours of statistical simulation time to process typically many different devices in the circuit, the designer may not be able to manage the modification process well enough to progress toward an acceptable solution.

This simulation bottleneck may be preventing designers from incorporating statistical considerations into their efforts. Accordingly, the present application describes a solution that may provide designers with an approximate representation of the statistical variation in circuit performance. The solution may be far faster than current approaches, and may be of particular utility when using the Fast SPICE type simulators, but may also be used with conventional SPICE tools. The solution may provide sufficient accuracy to allow the designer to perform design modifications that may lead to acceptable final designs.

Addressing the last point first, any approximate solution to statistical circuit modeling is preferably not so inaccurate as to dominate the process-dependent variations in the fabrication technology used for manufacturing. In 45 nm processes, mismatch variations of fifteen percent are not unusual. What will be the effect of a two to five percent variation introduced by a Fast SPICE simulation tool?

Figure 2:
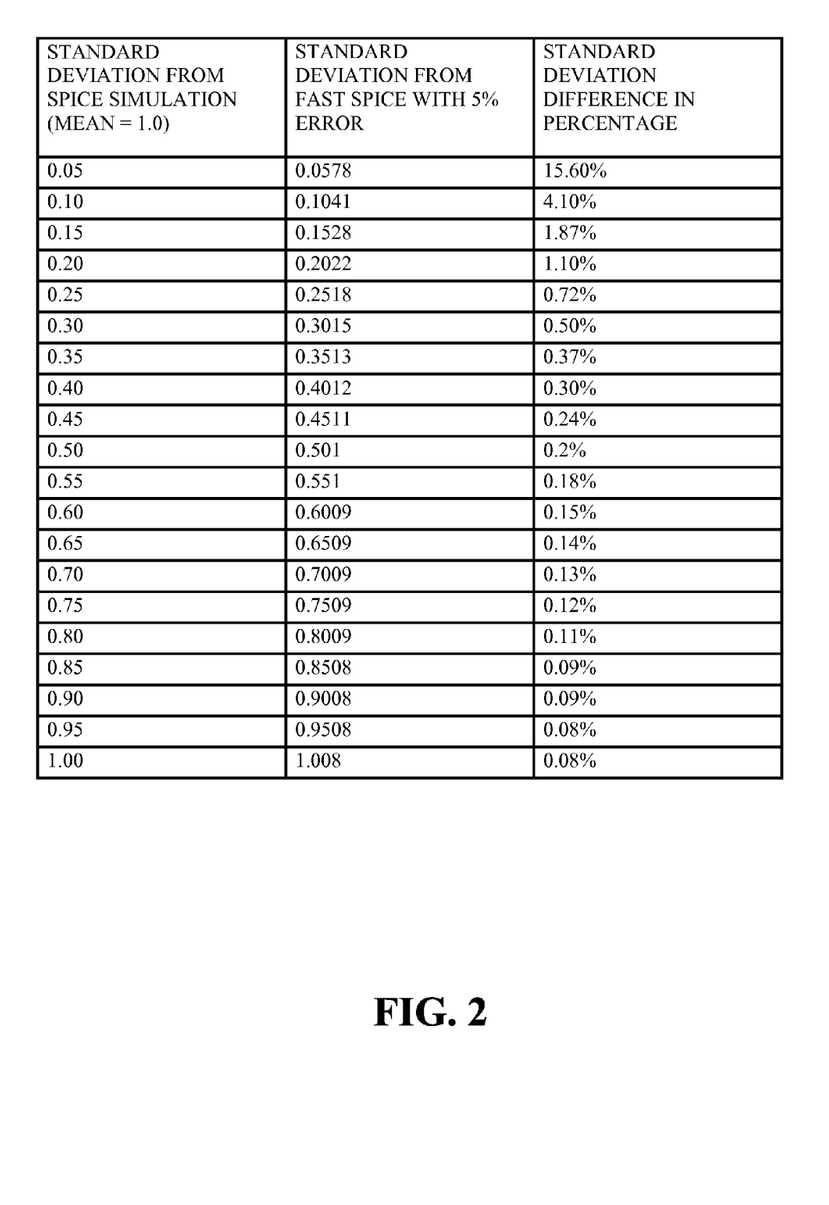
FIG. 2 is a table of errors introduced by a typical Fast SPICE simulation, according to an embodiment.

FIG. 2 shows a table of errors introduced by a typical Fast SPICE simulation, according to an embodiment. The Fast SPICE five percent error may be modeled as a random variation, X, with a uniform distribution of [0.95, 1.05] around a mean value of one. Each Monte Carlo analysis design point, Y, will include some error even with a conventional SPICE simulator using the best available statistical device models. The overall output of a Fast SPICE Monte Carlo analysis will therefore be X*Y.

When two independent variables are multiplied, the variation of the product is:

$$\mathrm{Var}(X*Y) = (E(Y)*E(Y)*\mathrm{Var}(X)) + (E(X)*E(X)*\mathrm{Var}(Y)) + (\mathrm{Var}(X)*\mathrm{Var}(Y))$$

FIG. 2 is a comparison table generated using this formula. Various standard deviation values from the conventional SPICE simulation are shown in the first column. The standard deviation resulting from the Fast SPICE simulation, with its five percent error, is shown in the middle column. The standard deviation difference, expressed as a percentage, is shown in the right column. The table indicates the five percent Fast SPICE error only introduces 1.87 percent error in output standard deviation if the underlying output standard deviation is fifteen percent. It is common to have at least fifteen percent underlying standard deviation in circuit output in advanced processes using sub-45 nm technology. Thus, the Fast SPICE five percent error has negligible impact on most circuit output distributions in modern processes.

Figure 3:
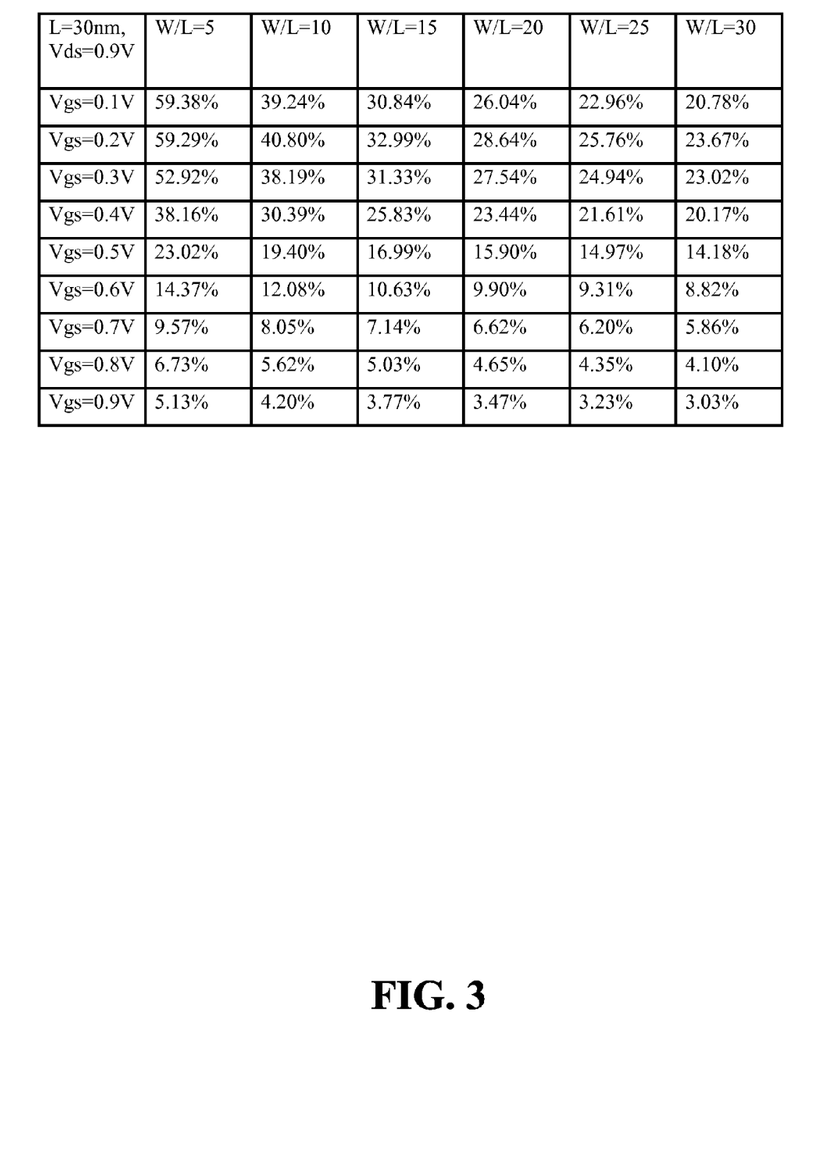
FIG. 3 is a table of Ids values for various Vgs settings, according to an embodiment.
Figure 4:
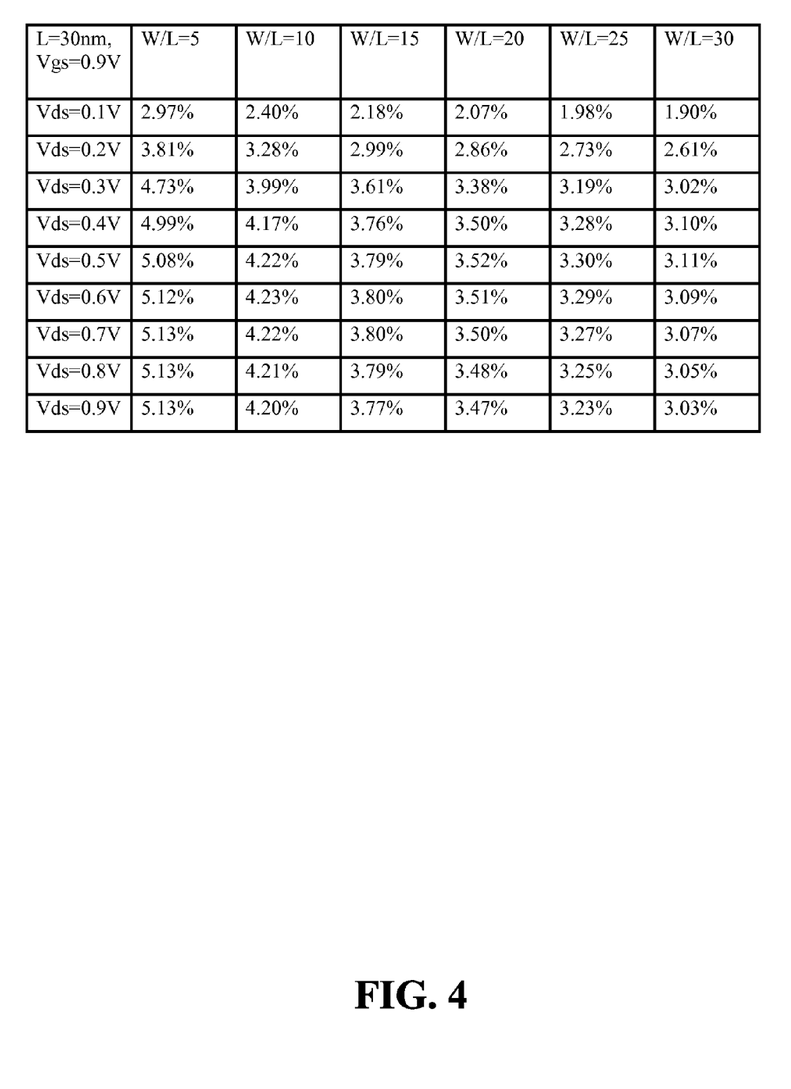
FIG. 4 is a table of Ids values for various Vds settings, according to an embodiment.

Next, consider the relative influence of typical design conditions for a given process on the mismatch variation. CMOS is the most commonly used integrated circuit technology today, so this application describes a design methodology in terms of MOS type devices, but the invention is not so limited. The methodology to be described may be applied to any type of device with any dominant parameter having a primary influence on device behavior. Circuit designers may most frequently control effective MOSFET channel length and width values, and the drain-source voltage (Vds) and gate-source voltage (Vgs) applied to devices in a CMOS circuit. FIGS. 3 and 4 explore the relative influence of the applied voltages on drain-source current (Ids) for a typical MOS device.

FIG. 3 shows a table of Ids values for various Vgs settings, according to an embodiment. The data are for a device with a 30 nm effective channel length from a 20 nm process. Single transistor tests ran a thousand samples of these devices with Vds=0.9V, Vgs ranging between 0.1V and 0.9V, and width/length (W/L) ratios of five to thirty. Standard deviation/nominal value ratios are expressed as percentages. The results varied from 59 percent to 3 percent, with higher gate-source voltages and higher width/length ratios leading to decreased mismatch variation.

FIG. 4 shows a table of Ids values for various Vds settings, according to an embodiment. As with FIG. 3, single transistor tests ran a thousand samples of these devices, again with width/length (W/L) ratios of five to thirty, but now with Vgs=0.9V and Vds ranging between 0.1 and 0.9V. Standard deviation/nominal value ratios are again expressed as percentages. The results varied from three percent to five percent. These results indicate, not surprisingly, that gate-source voltage sensitivity may be a much larger factor in mismatch variation than drain-source voltage sensitivity, and that device geometry may also be significant.

Device mismatch variation is known to vary inversely with device area. Small MOS devices have a relatively small number of dopant atoms in the conductive channel. The granularity of a small number of dopant atoms and their individual arrangement may cause essentially random fluctuations in device behavior. Pelgrom's Law describes this spatial averaging effect, wherein local and random variations decrease as the device size increases, since the parameters "average out", or become less granular, over a greater area. Mathematically, Pelgrom's Law states that the variance of the mismatch of a parameter P is:

$$s^2(\Delta P) = (Ap)^2/WL, \text{ where:}$$

$\Delta P$ = mismatch in a parameter, P
WL = effective width times effective length of the device (i.e., the effective device area)
Ap = proportionality constant between the standard deviation of $\Delta P$ and the effective area of the device Pelgrom's Law also includes a term relating the variance of the mismatch of a parameter to the distance between individual devices. However, as circuit designers do not often consider inter-device distance during initial pre-layout design iterations, it is ignored here. Also note that this formulation of device mismatch variation is exemplary and non-limiting. Other formulations of geometry effects may be used, as may be known in the art. For example, at very small geometries, threshold voltage may vary as $(WL)^n$, where n may be for example 0.49 instead of 0.50.

Figure 5:
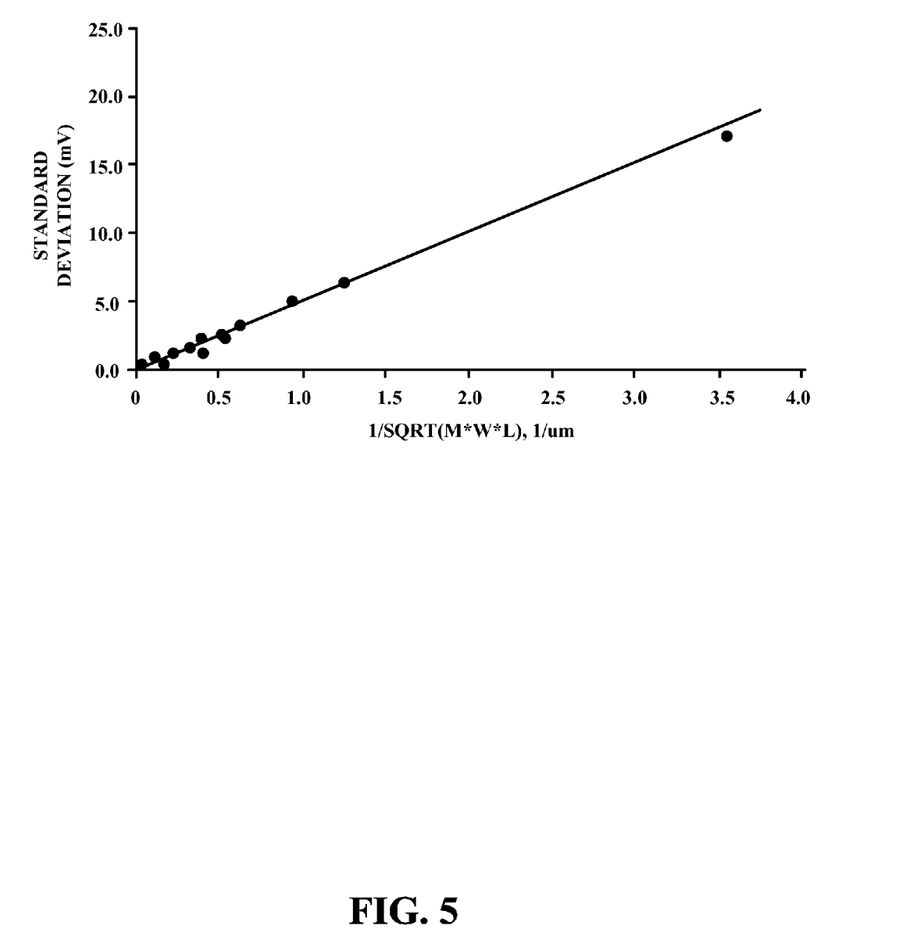
FIG. 5 is a graph of geometry effects on mismatch variation, according to an embodiment.

FIG. 5 shows a graph of geometry effects on mismatch variation, according to an embodiment. The standard deviation in threshold voltage, i.e. the gate-source voltage required to induce a conductive channel to form in a MOSFET, is shown versus $1/\sqrt{MWL}$, consistent with the description of Pelgrom's Law above. Here M is the number of fingers in a given transistor. Transistors fabricated with more advanced processes with smaller feature sizes tend to show more statistical variation, as more physical effects are evident. These effects may include for example:

Electrical gate oxide equivalent thickness
Channel length offset due to mask etch
Channel width offset due to mask etch
Long-channel threshold voltage at Vbs=0
Low-field mobility
Drain induced barrier lowering (DIBL) coefficient in sub-threshold region None of these factors is shown to be dominant over threshold voltage influences, however. Further, the statistical models for such deep submicron devices may become quite complex, making it difficult for designers to discern statistical interrelationships. It may also be very time consuming for even Fast SPICE technology to rebuild the full internal device model parameter set for every Monte Carlo analysis iteration.

Figure 6:
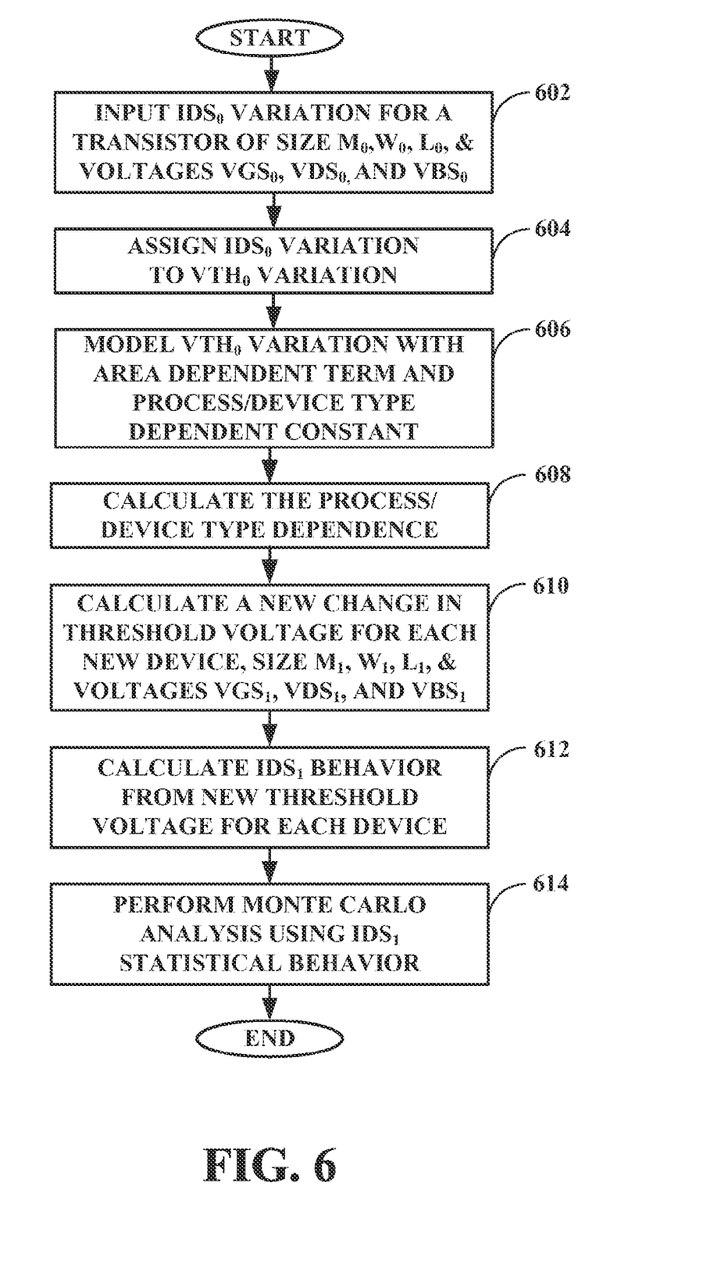
FIG. 6 is a flowchart of a method of threshold voltage mismatch variation modeling, according to an embodiment.

FIG. 6 shows a flowchart of a method of threshold voltage mismatch variation modeling, according to an embodiment. The inventive method addresses the problems described above by modeling MOS device statistical variation using threshold voltage variation. Some statistical variations have naturally been included in threshold voltage variation already. Other statistical variations due to different physical phenomena may also be modeled as if they were caused by threshold variation.

Specifically, the embodiments may require as input a measure of the drain-source current ($Ids_0$) variation for a transistor with dimensions $W_0$ and $L_0$, number of transistor fingers $M_0$, at bias voltages $Vgs_0$, $Vbs_0$, and $Vds_0$, as shown in 602. (Note, during early experiments the value of $Vbs_0$ used was zero, but other values and their influences on threshold voltage also may be included. Similarly, the number of fingers in a device was set to one during early experiments, but other values and their influences on threshold voltage may also be included.) This input may be from a Monte Carlo mismatch analysis, from measured data, or may be defined by a user. The variation in drain-source current may be ascribed to a variation in threshold voltage at 604: $\Delta Ids_0 = \partial(Ids_0)/\partial(Vth_0) * \Delta Vth_0$.

The threshold voltage variation may then be modeled at 606 as the combination of an area dependent term multiplied by a process dependent term, such as:

$$\Delta Vth_0 \approx A\Delta \text{mismatch}/\sqrt{(\text{Area}_0)}.$$

The term $A\Delta$mismatch is a constant that may model the original complex statistical device model for a given process. Different values may be required for each device type, e.g. PMOS and NMOS. Its values may be calculated easily at 608 from a Vgs-based table model or from transconductance data, such as:

$$A\Delta \text{mismatch} \approx -Ids_0 * (\partial Vgs_0/\partial Ids_0) * \sqrt{(\text{Area}_0)}.$$

For each new device with new effective dimensions of $W_1$ and $L_1$, number of fingers $M_1$, and applied voltages $Vgs_1$, $Vbs_1$, and $Vds_1$, a new $\Delta Vth_1$ may be calculated at 610 directly, such as:

$$\Delta Vth_1 \approx A\Delta \text{mismatch}/\sqrt{(\text{Area}_1)}$$

At 612, the embodiments may calculate $Ids_1$ for each new device according to the new threshold voltage value. At 614, statistical circuit behavior may be determined by a Monte Carlo analysis.

The specific advantages of this approach may include:
Threshold voltage variation may be quickly adopted in the existing Fast SPICE in-memory device model data structures. There is no need to rebuild and calculate the device model parameters to determine complex device statistical variation when performing Monte Carlo analysis. Only the threshold voltage variation may be needed to generate a new device variation.
Experimental results show very good accuracy for both single transistors and large circuits. Calculated Ids variation has good correlation with Vgs and device size changes. On average, ninety percent of Ids variation may be captured from real device statistical models.
It may be easier for a designer to analyze the statistical sensitivity results, because each device has only one equivalent variation source.

To test the approach followed by the inventive embodiments, a single device's Ids variation was modeled as an example. First, one reference device's one thousand Monte Carlo mismatch variation simulation result was used as input to generate $A\Delta$mismatch. Next, the modeled threshold voltage variation was calculated for all other devices. The threshold voltage was then applied to calculate the standard deviation of Ids variation. Finally, the standard deviation of the Ids variation was compared with the one thousand Monte Carlo mismatch results for each device with different dimensions and applied voltages Vgs and Vds, and a relative error was outputted as a percentage.

Figure 7A:
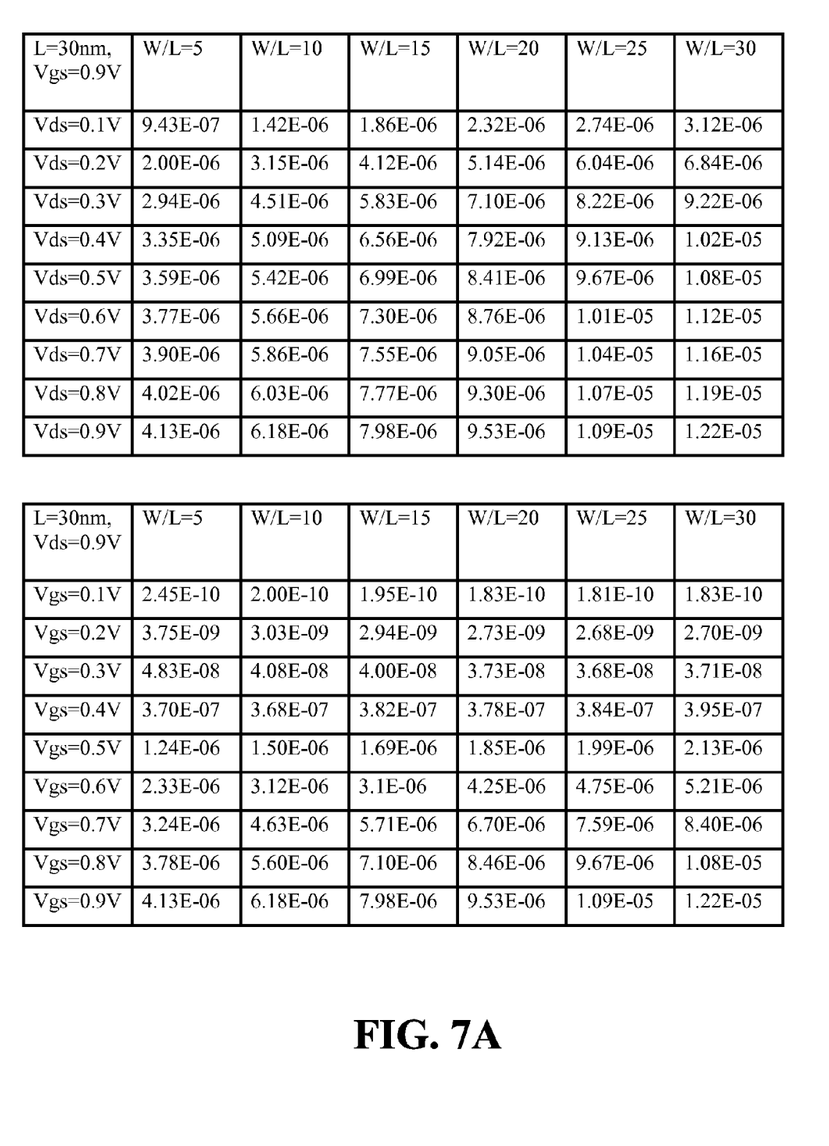
FIG. 7A is a table of Ids standard deviation values generated from a Monte Carlo analysis from a full SPICE model, according to an embodiment.

FIG. 7A shows a table of Ids standard deviation values generated from a Monte Carlo analysis from a full SPICE model, according to an embodiment. Various Vgs and Vds values and W/L ratios may be used to generate a variety of beginning points from which to choose. In this example, the chosen reference device may have $W_0=150$ nm and $L_0=30$ nm, so its W/L ratio is five. At the selected exemplary applied voltages of $Vgs_0=0.9V$ and $Vds_0=0.9V$, the standard deviation of the Ids variation is shown to be 4.13E-6.

Figure 7B:
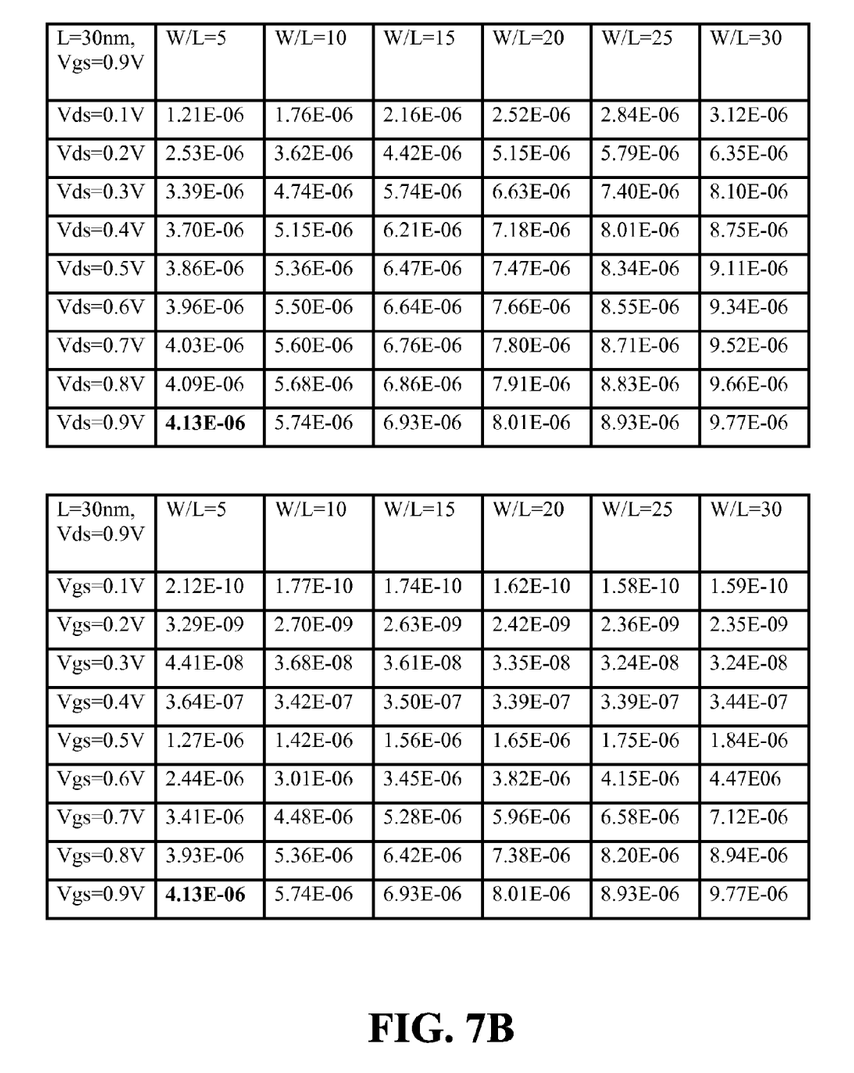
FIG. 7B is a table of Ids standard deviation values generated from a Monte Carlo analysis via threshold voltage mismatch variation modeling, according to an embodiment.

FIG. 7B shows a table of Ids standard deviation values generated from a Monte Carlo analysis via threshold voltage mismatch variation modeling, according to an embodiment. The threshold voltage variation may be calculated and used to compute Ids values for the Monte Carlo simulation as previously described with respect to FIG. 6. Various device widths may be selected, so that with $L_1=30$ nm the $W_1/L_1$ ratios were 5, 10, 15, 20, 25, and 30 as before. Applied voltages $Vgs_1$ and $Vds_1$ may be stepped from 0.1V to 0.9V at 0.1V intervals as before. Thus, a direct comparison between the traditional SPICE variation model and the variation generated via the embodiment may be made.

Figure 7C:
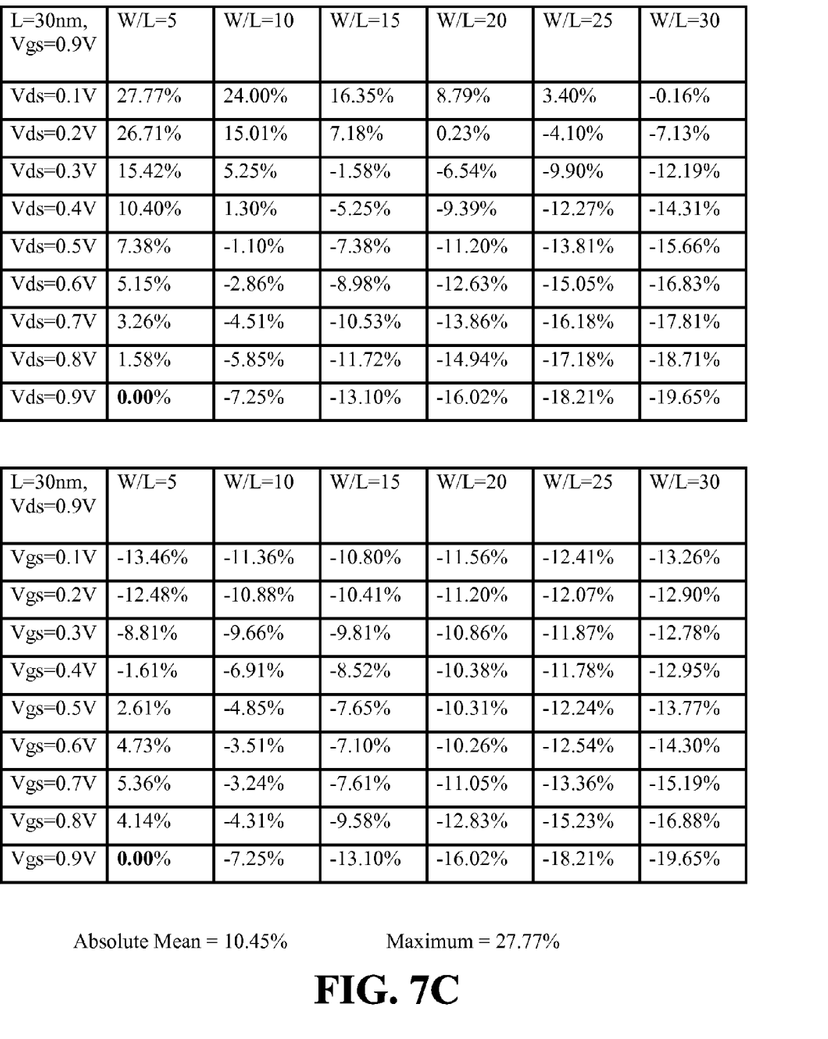
FIG. 7C is a table of relative error between the conventional Monte Carlo SPICE model analysis and the Monte Carlo analysis via threshold voltage mismatch variation modeling, according to an embodiment.

FIG. 7C shows a table of relative error between the conventional Monte Carlo SPICE model analysis and the Monte Carlo analysis via threshold voltage mismatch variation modeling, according to an embodiment. On average, the absolute mean relative error is 10.45 percent, with a maximum relative error of 27.77 percent occurring only at a very low Vds value and the smallest W/L ratio. Therefore, the embodiment described adequately approximates the device mismatch behavior of a conventional SPICE simulation.

Figure 8:
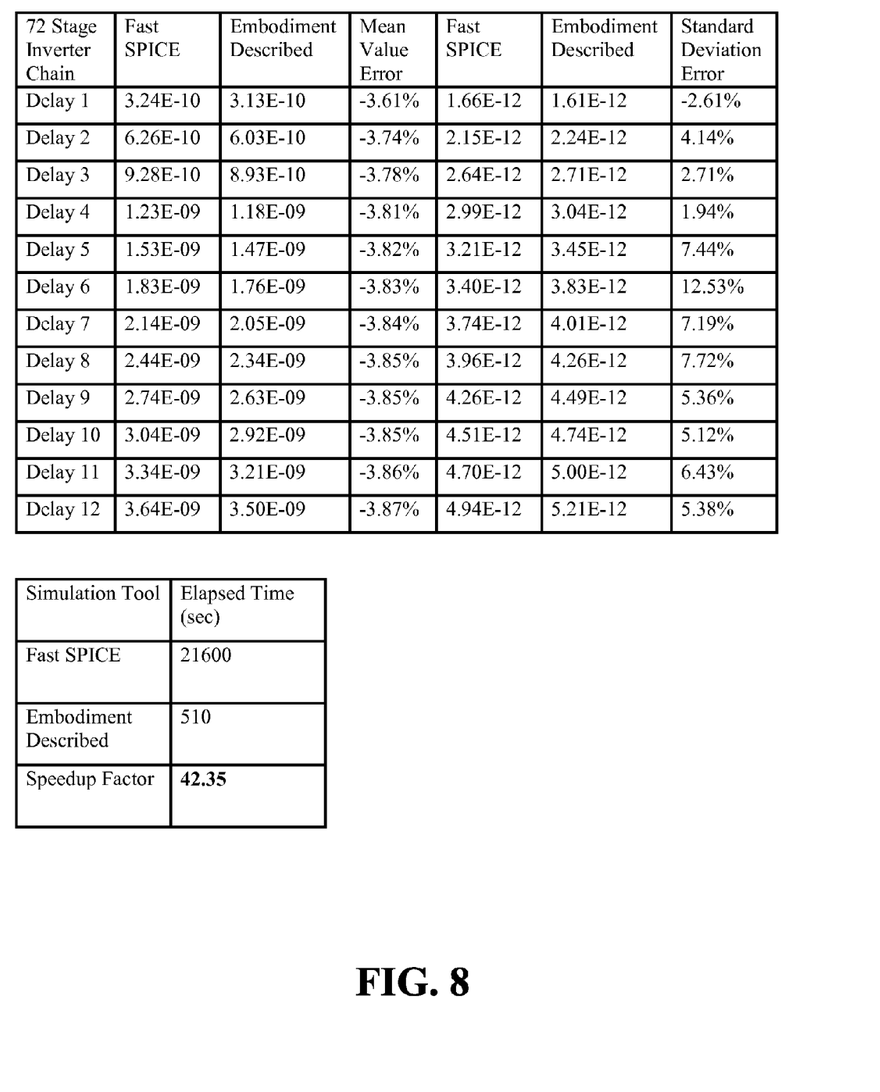
FIG. 8 is a table comparing the results of Monte Carlo analyses from a full SPICE model and via threshold voltage mismatch variation modeling for an inverter chain circuit, according to an embodiment.

FIG. 8 shows a table comparing the results of Monte Carlo analyses from a full SPICE model and via threshold voltage mismatch variation modeling for a 72-stage inverter chain circuit, according to an embodiment. Delays at individual inverters may be matched quite well, as denoted by the mean value error percentages and the standard deviation error percentages. Further, the embodiments have yielded a 42× increase in simulation speed for a Fast SPICE simulation for a significant test circuit. An even greater relative increase in speed may be achieved over a conventional SPICE Monte Carlo simulation.

Figure 9:
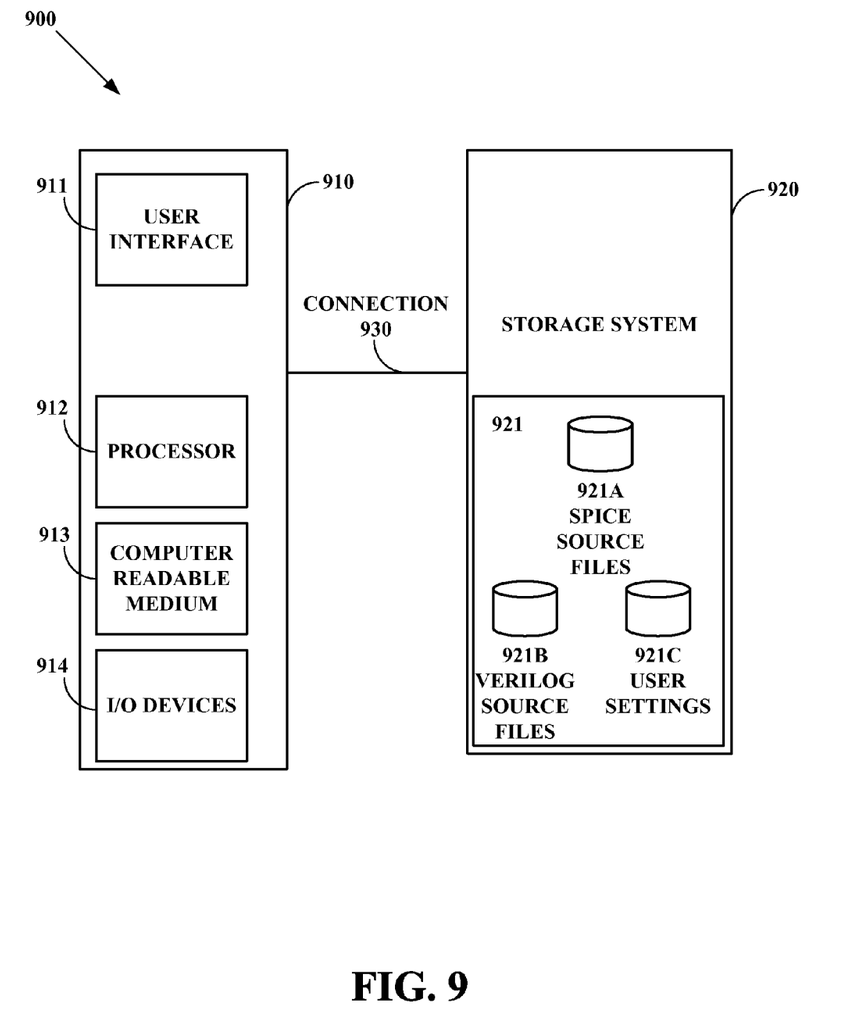
FIG. 9 is a block diagram of a circuit analysis system, according to an embodiment.

FIG. 9 shows a block diagram of an exemplary circuit analysis system 900, according to an embodiment. This system may provide simulator functionality for any of the methods described above. A user may access the system 900 through a standalone client system, client-server environment, or a network environment. System 900 may comprise one or more clients or servers 910, one or more storage systems 920, and a connection or connections 930 between and among these elements.

Client 910 may execute instructions stored on transitory or non-transitory computer readable medium 913 with processor 912, and may provide a user interface 911 to allow a user to access storage system 920. The instructions may be part of a software program or executable file that may operate electronic design automation (EDA) software. Client 910 may be any computing system, such as a personal computer, workstation, mobile computer, or other device employing a processor which is able to execute programming instructions. User interface 911 may be a graphical user interface (GUI) run in a user-controlled application window on a display. A user may interact with user interface 911 through one or more input/output (I/O) devices 914 such as a keyboard, a mouse, or a touch screen.

Storage system 920 may take any number of forms, including but not limited to a server with one or more storage devices attached to it, a storage area network, or one or a plurality of non-transitory computer readable media. Databases 921 may be stored in storage system 920 such that they may be persistent, retrieved, or edited by the user. Databases 921 may include SPICE source files 921A, Verilog source files 921B, and a user input database 921C for example. These databases may be kept as separate files or systems, or may be merged together in any appropriate combination.

Only one client 910 is shown connected to storage system 920 through connection 930, which may be a simple direct wired or wireless connection, a system bus, a network connection, or the like, to provide client 910 with access to storage system 920. In another aspect, connection 930 may enable multiple clients 910 to connect to storage system 920. The connection may be part of a local area network, a wide area network, or another type of network, again providing one or more clients with access to storage system 920. Depending on system administrator settings, client 910's access to system storage 920 or to other clients may be limited.

Figure 10:
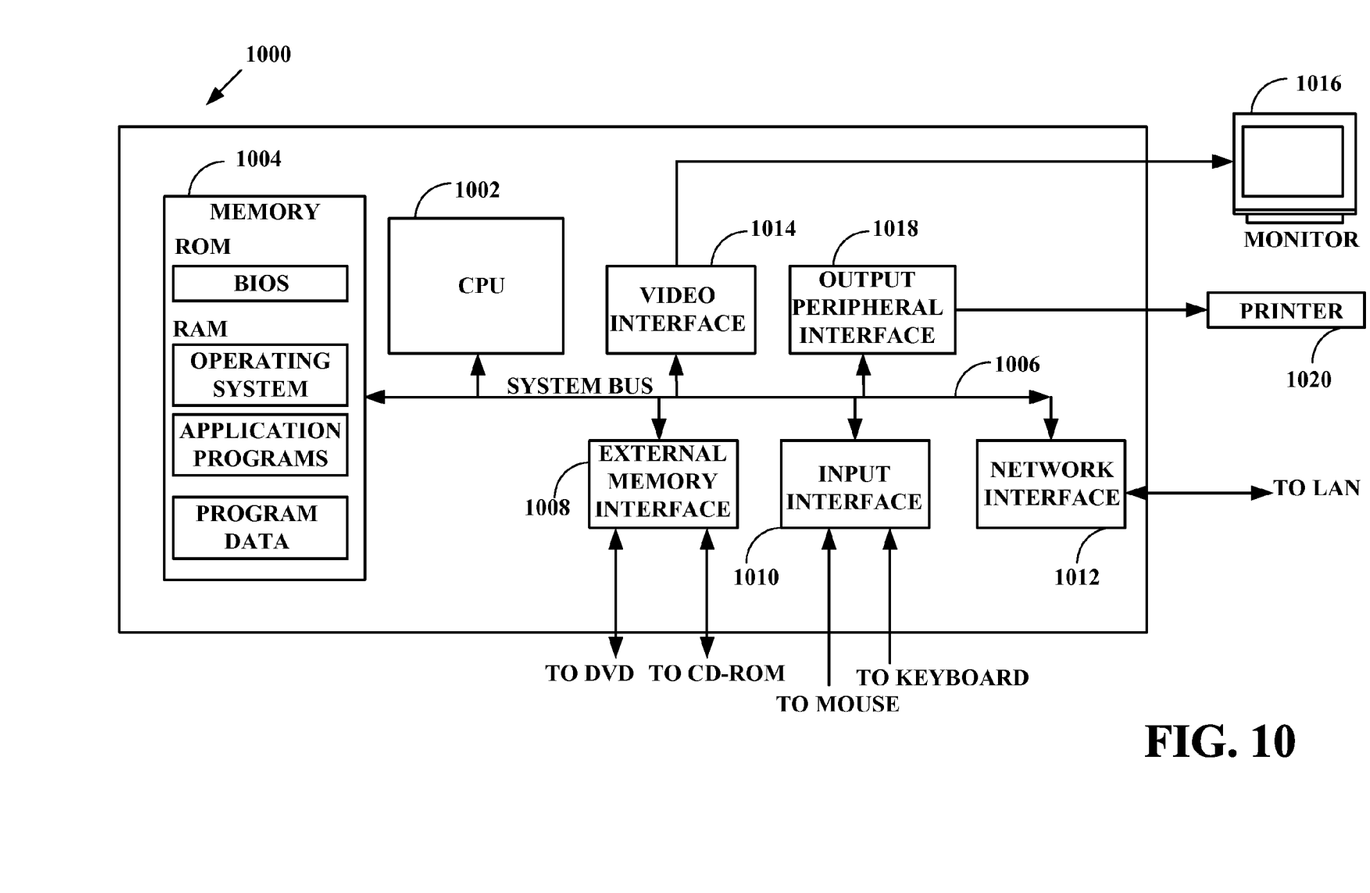
FIG. 10 is a diagram of a computer system, according to an embodiment.

FIG. 10 depicts a computer system comprising the structure for implementation of the embodiments described above. Computer system 1000 may comprise a central processing unit (CPU) 1002 that processes data stored in memory 1004 exchanged via system bus 1006. Memory 1004 typically includes read-only memory, such as a built-in operating system, and random-access memory, which may include an operating system, application programs, and program data. Computer system 1000 may also comprise an external memory interface 1008 to exchange data with a DVD or CD-ROM for example. Further, input interface 1010 may serve to receive input from user input devices including but not limited to a keyboard and a mouse. Network interface 1012 may allow external data exchange with a local area network (LAN) or other network, including the internet. Computer system 1000 also typically comprises a video interface 1014 for displaying information to a user via a monitor 1016. An output peripheral interface 1018 may output computational results and other information to output devices including but not limited to a printer 1020.

Computer system 1000 may comprise for example a personal computer or an engineering workstation, each of which is widely known in the art and is commonly used for integrated circuit design tasks, along with software products commercially available for performing computer-aided integrated circuit design tasks. Computer system 1000 may also comprise a mobile computer, including for example a tablet computer or a smart phone. The computer system of FIG. 10 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method comprising:
    assigning device behavior variation to a dominant parameter variation;
    separating the dominant parameter variation into a device geometry dependent term and a process and device type dependent term; and
    performing a Monte Carlo circuit simulation on a computer, including calculating device behavior variation from the dominant parameter variation for selected values of device geometry and applied voltage.

2. The method of claim 1 wherein the device behavior variation includes variation in drain-source current for a metal-oxide-semiconductor (MOS) device, and the dominant parameter variation is a threshold voltage variation.

3. The method of claim 2 wherein the device geometry dependent term varies a threshold voltage substantially inversely with the square root of effective device area.

4. The method of claim 1 wherein the device behavior variation is input from one of a Monte Carlo mismatch analysis, measurement data, and a user definition.

5. The method of claim 1 wherein the device geometry includes a number of transistor fingers, an effective channel length, and an effective channel width.

6. The method of claim 1 wherein the circuit simulation runs on one of a SPICE simulator and a Fast SPICE simulator.

7. The method of claim 1 wherein the circuit simulation is performed more quickly because device behavior variation is calculated from the dominant parameter variation instead of from a full internal device model parameter set for every Monte Carlo analysis iteration.

8. A non-transitory computer readable medium storing instructions that, when executed by a processor, perform a method comprising:
   assigning device behavior variation to a dominant parameter variation;
   separating the dominant parameter variation into a device geometry dependent term and a process and device type dependent term; and
   performing a Monte Carlo circuit simulation, including calculating device behavior variation from the dominant parameter variation for selected values of device geometry and applied voltage.

9. The medium of claim 8 wherein the device behavior variation includes variation in drain-source current for a metal-oxide-semiconductor (MOS) device, and the dominant parameter variation is a threshold voltage variation.

10. The medium of claim 9 wherein the device geometry dependent term varies a threshold voltage substantially inversely with the square root of effective device area.

11. The medium of claim 8 wherein the device behavior variation is input from one of a Monte Carlo mismatch analysis, measurement data, and a user definition.

12. The medium of claim 8 wherein the device geometry includes a number of transistor fingers, an effective channel length, and an effective channel width.

13. The medium of claim 8 wherein the circuit simulation runs on one of a SPICE simulator and a Fast SPICE simulator.

14. The medium of claim 8 wherein the circuit simulation is performed more quickly because device behavior variation is calculated from the dominant parameter variation instead of from a full internal device model parameter set for every Monte Carlo analysis iteration.

15. A system comprising:
   a memory storing executable instructions; and
   a processor executing instructions to:
      assign device behavior variation to a dominant parameter variation;
      separate the dominant parameter variation into a device geometry dependent term and a process and device type dependent term; and
      perform a Monte Carlo circuit simulation, including calculating device behavior variation from the dominant parameter variation for selected values of device geometry and applied voltage.

16. The system of claim 15 wherein the device behavior variation includes variation in drain-source current for a metal-oxide-semiconductor (MOS) device, and the dominant parameter variation is a threshold voltage variation.

17. The system of claim 16 wherein the device geometry dependent term varies a threshold voltage substantially inversely with the square root of effective device area.

18. The system of claim 15 wherein the device behavior variation is input from one of a Monte Carlo mismatch analysis, measurement data, and a user definition.

19. The system of claim 15 wherein the device geometry includes a number of transistor fingers, an effective channel length, and an effective channel width.

20. The system of claim 15 wherein the circuit simulation runs on one of a SPICE simulator and a Fast SPICE simulator.

21. The system of claim 15 wherein the circuit simulation is performed more quickly because device behavior variation is calculated from the dominant parameter variation instead of from a full internal device model parameter set for every Monte Carlo analysis iteration.

\* \* \* \* \*